A. R. BULLOCK.
CURRENT TRANSFORMING DEVICE.
APPLICATION FILED NOV. 23, 1910.
1,119,397.
Patented Dec. 1, 1914.
2 SHEETS—SHEET 2.
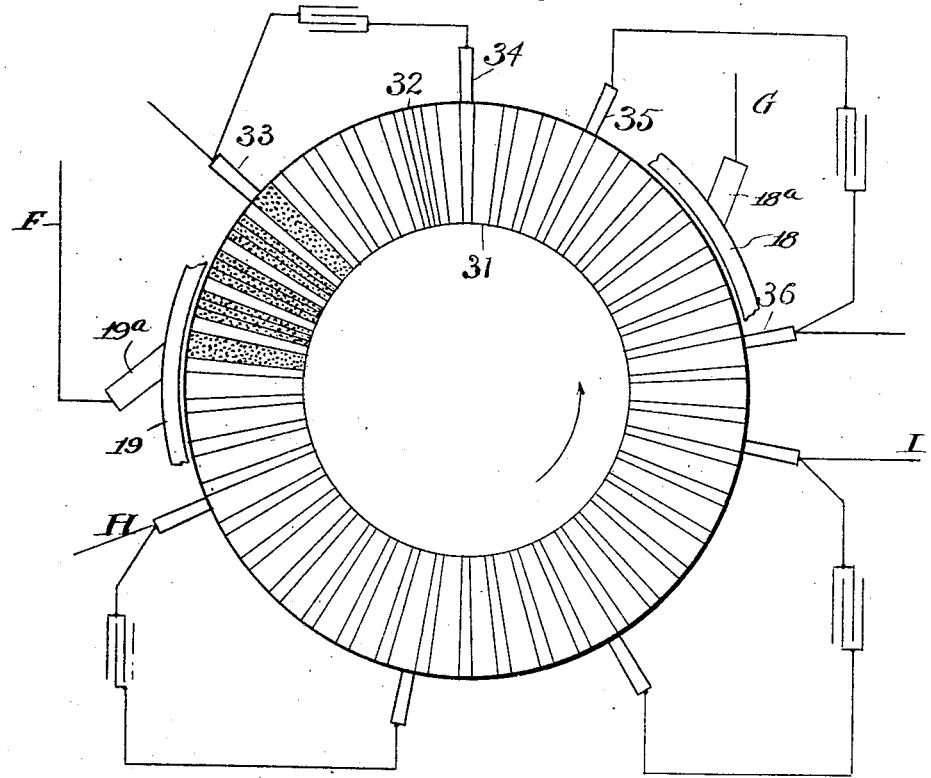
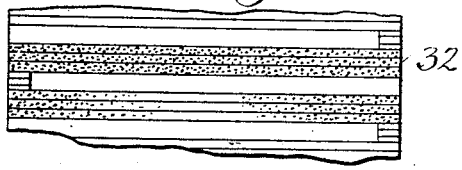
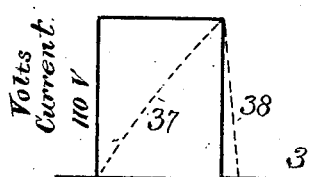
Witnesses
E. B. Gilchrist
H. P. Sullivan
Inventor
Arthur R. Bullock
by Thurston & Kwis
Attys

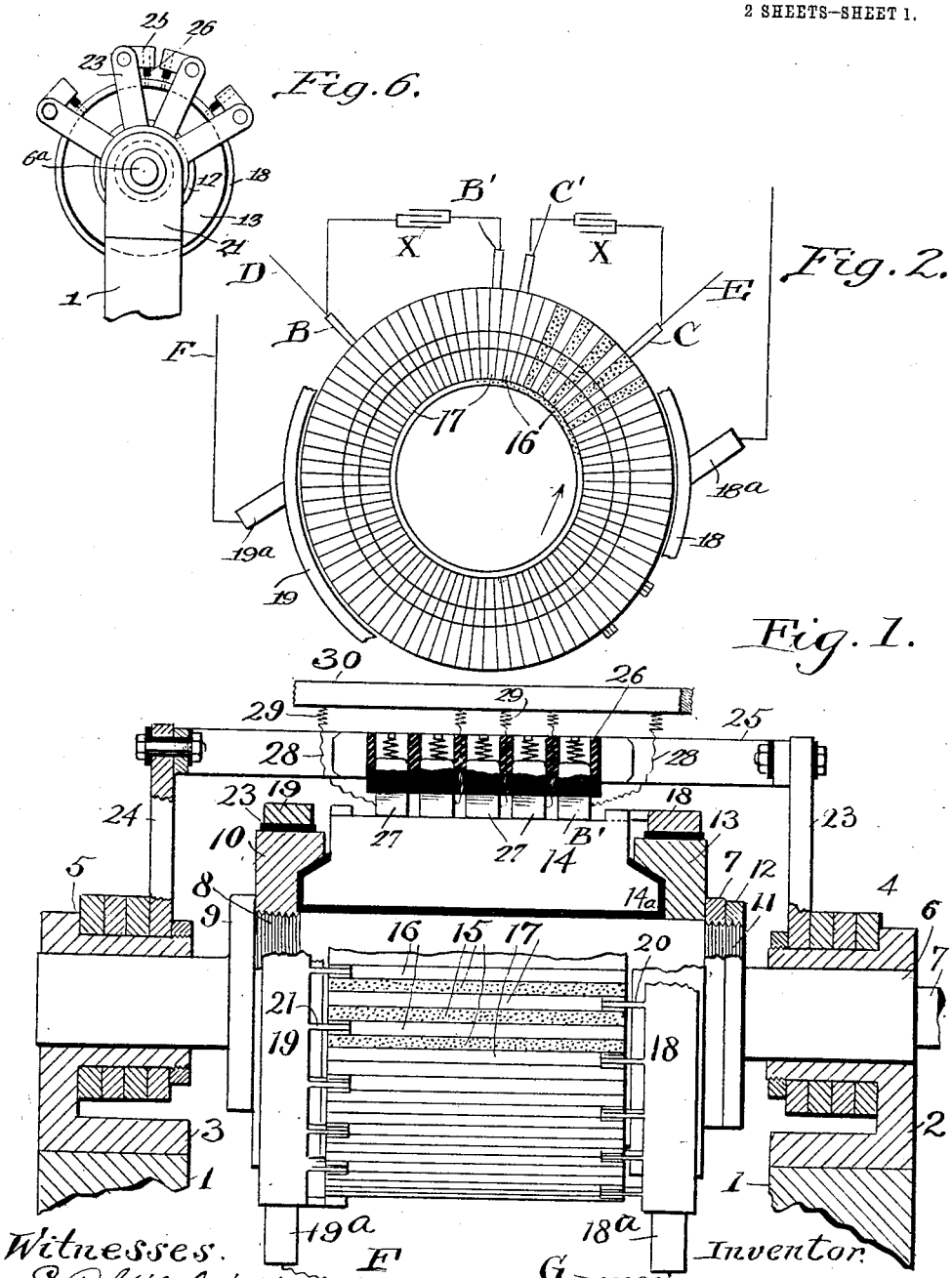

UNITED STATES PATENT OFFICE.

ARTHUR R. BULLOCK, OF CLEVELAND, OHIO, ASSIGNOR, BY MESNE ASSIGNMENTS, TO HENRY C. LEE, TRUSTEE.

CURRENT-TRANSFORMING DEVICE.

1,119,397.      Specification of Letters Patent.      Patented Dec. 1, 1914.

Application filed November 23, 1910. Serial No. 593,776.

*To all whom it may concern:*

Be it known that I, ARTHUR R. BULLOCK, a citizen of the United States, residing at Cleveland, in the county of Cuyahoga and State of Ohio, have invented a certain new and useful Improvement in Current-Transforming Devices, of which the following is a full, clear, and exact description.

This invention relates to a device which will by mechanical means convert a direct current into an alternating current, or vice versa, will produce an alternating current of substantially any desired frequency, and more particularly discloses a device which develops an alternating current of peculiar characteristics as will later appear more fully.

Generally speaking, the invention comprises the elements and the combinations thereof, as set forth in the accompanying claims.

Reference should be had to the accompanying drawings forming a part of this specification, in which—

Figure 1 is a front elevation of so much of the machine as it is deemed necessary to illustrate,—certain portions of the machine being shown in section. Fig. 2 is a central transverse section through the rotating member and showing the relative position of the brushes. Fig. 3 is a central transverse vertical section of a modified form of rotating member. Fig. 4 is a fragmentary portion of a plan view of the rotor showing the relation of the bars; and Fig. 5 diagrammatically shows the characteristics of the alternating current which is produced when the rotating member shown in Fig. 3 is used, Fig. 6 is a side elevation showing the commutator and brush holders.

In view of the fact that a single or multiphase alternating current is the usual current output of all power stations, it has been necessary for all electrical apparatus to conform in its requirements as to current, with that which has been the output of the power stations.

There are many forms of electrical apparatus which require a direct current, such, for instance, as the charging of storage cells and other forms of apparatus which could be more economically and conveniently used if a direct current were available, but, due to the difficulty in transmitting and transforming direct currents, it is the customary practice for the power houses to supply a single or multi-phase alternating current. The machine as shown and described is adapted to rectify such an alternating current. Furthermore, the device may use a direct current and change the same into alternating, and may deliver this alternating current at substantially any frequency, which it is desired to use,—it being merely a matter of proportioning the parts, that is securing a large enough rotating member to produce any frequency which is desired.

In Fig. 1 of the drawings a pedestal is shown at 1, upon which are carried bearing blocks 2, 3, upon the opposite sides of the pedestal. These bearing blocks are provided with sleeves 4, 5, which form journals for the opposite ends of a shaft 6. One end of the shaft 6 is provided with an extension 7 which may be suitably connected with a prime mover for the purpose of rotating the shaft 6.

Centrally located upon the shaft 6 between the bearings 2, 3, is a rotating member which may be generally represented by the reference character 7. This rotating member comprises a central drum 8 which is provided with a flange 9 at one end, against which seats an undercut ring 10. At the opposite end the drum is screw threaded, as indicated at 11, and is provided with nuts 12 which bear against an undercut ring 13 which slides upon the drum. The copper segments or bars forming the periphery of the member are represented at 14, and are provided with shoulders 14ª which are engaged by the rings 10 and 13, so that when the nuts 12 are secured, the segments 14 are held in proper relative position.

The bars forming the periphery of the rotating member are arranged in a series with insulation between each bar, and in use each pair of live bars is interspersed with a dead bar, such as illustrated at 15. The dead bars are slightly greater in width than the live bars. For practical purposes, this bar is of copper, the same as the bars 14, but it is electrically disconnected from all parts of the apparatus, and hence is termed a dead bar. The bars 16 and 17, which are upon the opposite sides of each dead bar 15, are connected to rings 18 and 19,—the bars 16 being connected to the ring 19, while the bars 17 are connected with the ring 18.

Any desired form of electrical connection may be used for the purpose of joining the rings 18 and 19 with their respective segments, but, for the purpose, I prefer to use annular rings provided with projections 20 and 21, and to provide the several bars 16 and 17 with raised lugs which are slotted, the bars 20 and 21 extending into the slots, which construction will securely hold the rings 18 and 19 in proper relative position.

As will be apparent, I have shown the rings 18 and 19 as encircling the members 10 and 13 of the member 8, but such a positioning of these members is not absolutely necessary, but is adopted for the purpose of economizing space. A fiber washer or its equivalent is inserted between the rings and the members which they encircle, as indicated at 22 in Fig. 1.

From the foregoing, it will be clear that all of the segments 16 are electrically connected with the ring 19, while all of the segments 17 are electrically connected with the ring 18. Upon each of the sleeves 4 and 5 arms 23 and 24 are mounted, which arms are adjustable angularly with respect to their bearings, and at their ends support transverse bars, such as represented at 25, upon which bars are mounted the brushes or contact members B, B', C' and C. Each contact member may consist of one or more brushes such as represented at 27 in Fig. 1,—this particular set shown being the contact member represented at B in Fig. 2. Four of such arms 23, 24, are shown in the drawnigs,—this being the number of sets of brushes which are used with this particular machine, but it will be apparent that a greater or less number may be used as occasion may demand.

If desired, the current which is collected by the brushes 27 from the segments, or, on the other hand, current which is delivered through brushes 27 to the segments, may be conducted over the bars 25, and for this purpose electrical conductors may be secured to the proper bars. But I prefer to insulate each of the brushes 27 and to connect each of the brushes by a suitable conductor 28, which is in series, with a coil 29, which coil may be either a reactance coil or a resistance coil, and is electrically connected to a bus bar 30. It will, of course, be understood that a separate bus bar is employed for each set of brushes.

For the purpose of the present machine, and as far as the manipulation of the electric current is concerned, two brushes are all that are required, and the position of these brushes is diagrammatically represented at B and C in Fig. 2, and the brushes are so positioned with respect to each other that one is making contact with one of the segments 17 while the other is making contact with one of the segments 16. These brushes are connected with each other by means of the external conductors D, E, which supply the electrical apparatus to be operated with the current. The rings 13 and 19 are contacted by brushes 18$^a$ and 19$^a$, to which electrical conductors F and G are connected.

The operation of the machine, as thus far disclosed, may be effected in one of two ways. If, for instance, a direct current be supplied through the wires F and G, and we were to consider the wire G as the positive conductor, then current being supplied to the brush 18$^a$ and to the ring 18 will, through the connections previously described, supply the bars 17 with current, which, as the member 7 revolves will flow alternately to the brushes B and C, and return alternately through the brushes C and B and passing to the segments 16 and ring 19 will return along the conductor F. Therefore at alternate periods a current would flow out over the conductor D and back over the conductor E, and then reversing itself would flow over the conductor E and back over the conductor D. Thus, from the direct current which was supplied to the brushes 18$^a$ and 19$^a$, there would be delivered through the conductors D and E an alternating current. The frequency of this alternating current will depend entirely upon the speed at which the member 7 is run, for the speed of this member is the single factor which governs the number of makes and breaks between the segments and the brushes which bear upon them. Of course, the diameter of the drum 8 would have to be chosen with respect to the frequency which it was desired to obtain, for there is a practical limit to the speed at which the drum may be revolved, but it will be well understood that as the diameter of the drum increases and thereby the circumferential length, that the peripheral speed increases, if the shaft upon which the rotating member is mounted be rotated at the same speed. It is therefore simply a question of mechanical design to obtain a drum which will produce any frequency desired, that is to say within the limits of the strength of the material used in the construction of the machine.

If it be desired the direct current may be supplied through the conductors D and E, in which event the current will be conducted through the segments 16 and 17 alternately to the bars 19 and 18, which will in turn deliver the current to the brushes 19$^a$ and 18ª, and this current will be supplied to the external conductors F and G in the form of an alternating current. It will, therefore, be apparent that the machine is reversible.

The practical difficulty about mechanical transforming devices, and it is true with regard to the construction which has just been described, lies in the fact that the make and break between the segments and the brushes which contact thereon, develop such sparking as to render such machine of no practical value, unless this sparking can be practically eliminated. Therefore it is necessary to use as a part of this apparatus some device which will absorb the current which may be flowing and the arc formed as the brushes break with the successive segments. In carrying out this idea an extra or auxiliary brush is provided for each of the brushes B and C, which brushes may be designated B' and C'. The brush B' and the brush C' are so placed with respect to the brushes B and C that they are always upon a segment of the same group of segments as their principal brush, and therefore, according to the construction previously disclosed, the segments in each group being electrically connected, it follows that the auxiliary brushes are electrically connected with their principal brush through the segments. Each principal and auxiliary brush is so spaced that as the principal brush is about to leave the particular segment with which it is in contact, the auxiliary brush is in full contact with the segment upon which it is bearing.

Each principal and its auxiliary brush are connected in series with a condenser X, and from the construction described it will be clear that as the principal brush is passing from the particular segment with which it is in contact, the current flowing in that particular segment, which current would tend to flow to the brush as it left the segment, will, on the contrary, flow through the other segment with which the auxiliary brush is making good electrical contact, and this for the reason that there is less resistance to the path of travel of the current in this direction than there would be for the current to flow to the principal brush. Therefore at the time a principal brush breaks contact with a conducting segment, a circuit containing capacity, or more specifically, a condenser, is introduced between the segment with which the auxiliary brush contacts and the principal brush. Remembering that the segment with which the auxiliary brush contacts at the moment is electrically connected with the segment with which the principal brush has just broken, and further that these segments are both electrically connected with one side of the circuit supplying current to the segment, it will be clear that the circuit containing capacity may be said to be introduced between the coöperating sides of the circuit of which the brushes F, G and B, C are the terminals.

It will be clear that the brush B, after having contacted with a segment 17, will next coöperate with a segment 16, after having passed a dead space 15. If we were to assume, therefore, that the bars 17 had previously been supplying a current to the brush B, then with the contact between the brushes B and the segments 16 the current would be flowing in the opposite direction,—that is, from the brush B to the segment 16. This then would bring the brush B' into contact with a segment 16, and consequently the current which had previously been stored in the condenser would be delivered through the brush B to the segment 16, and thus returned to the line conductor. From this it will be apparent that the condensers are alternately charged and discharged. This action of the condensers not only results in preventing sparking between segments and brushes, but also has a balancing and steadying effect upon the circuit carrying the converted current, probably due to the capacity effect in the circuit which is given by the condensers.

It has been found advantageous to use a series of brushes bearing upon the segments of the commutator, rather than a single brush, and in the drawing I have shown five brushes although more or less may be used, as necessity may demand. These brushes theoretically bearing upon the same segment at the same time should carry equal amounts of current, but in practice it is found that, due to mechanical imperfections, some brushes will usually be making better contact with the segments than others, and consequently that brush which is making the best contact will be carrying the greatest amount of current. Therefore, when the brush carrying the particular amount of current breaks its contact with a segment bar, the sudden breaking of the current causes an excessive spark, which, perhaps, may be due to the fact that the condenser does not act quickly enough. In any event, if some means could be provided for equalizing the current which would be taken by each brush so that each brush was taking substantially the same amount of current, then when the brushes break with any given segment, the current flowing between the segment and any given brush at the moment of the breaking will not be excessive and will readily be taken care of by the condenser. In carrying out this feature, as heretofore explained, a resistance or reactance coil is connected in series between each brush and a bus bar. If, then, any excessive current tends to flow through any one of the brushes, the current in passing through the coil 29 of that particular brush will be choked back and seek a path through one or more of the other brushes, and the coils 29 may be adjusted, so as to distribute substantially the same amount of current through each of the brushes. Of course, the current collected by the brushes will unite in flowing through the bus bar 30.

The rotating body and segment shown in Fig. 3 is of the same general type as that heretofore explained, with the exception that the dead space 31 between each live segment of the rotating member is substantially twice as great as the width of each live segment. And further, each dead space 31 is made up of a plurality of thin segments 32, each of which are insulated from the other and from the live bars upon either side of the end bars of the dead space. This is done for a dual purpose; first, to produce an electric current of particular and peculiar characteristics; and in the second place, to provide a series of insulated spaces between the live commutator bars, past which any arc, which might be formed upon the breaking of the current between a brush and segment, cannot traverse. For mechanical reasons the dead space cannot be formed entirely of insulating material.

The arrangement of the brushes 33, 34, 35 and 36 is relatively the same as that heretofore described, so that no further explanation of this feature will be necessary.

By the particular spacing and relationship between the live bars of the device, a current having characteristics represented by the curve shown in Fig. 5, is obtained. The curve in full lines represents the voltage while the curve in dotted lines represents the current. In both cases the horizontal line represents time. In a machine employing such a rotating member as just described the voltage immediately jumps to its maximum and maintains itself at that maximum during the entire time that the brushes are in contact with a rotating member segment, but the current lags behind the volts and may be graphically represented by the dotted line 37. As soon as the current has attained its maximum value, the rotating member segment passes from contact with the brush, at which instant the voltage immediately drops, but the current lags a little in this instance also, and may be represented by the line 38. The space 39 represents the interval or dead space between the flow of the current in one direction and the flow of the current in the opposite direction, and at the end of this dead space a current of the same characteristics as previously described passes over the conductors in the opposite direction.

It will be apparent that the current represented by the curve here shown and described is not a continuous alternating current, but there is an interruption between the successive alternations. This period or dead space may be reduced to a minimum by properly proportioning the dead bars upon the rotating member with respect to the width of the live bars, and in this way, if desired, a current having a curved characteristic closely approximating a sine wave may be obtained.

Thus far I have explained the use of the device in connection with the transforming of a direct current into an alternating, but the machine is equally adapted to rectify an alternating current. In this connection the member 7 is rotated by a motor which causes the rotating member to rotate synchronously with the generator which is supplying the alternating current, and the drum is rotated at such a speed that during the interval in which a segment of one group passes from beneath one of the brushes and is followed by a segment of another group the current will have changed its direction of flow. This may more readily be understood in connection with the following explanation. If, for instance, we assume that the alternating current in a given interval of time, is flowing over the conductor F through the brush 19$^a$, ring 19 and rotating member segments 16, then this current will flow through the brush C and upon the conductor E, returning over the conductor D, segments 17, ring 18, brush 18$^a$ and conductor G. As the segments rotate, in the next interval of time a segment 17 will come into contact with the brush C, while a segment 16 will come into contact with the brush B. During this time the current supplied by the generator will have changed its direction of flow so that the current will now be flowing through the conductor G, brush 18$^a$, ring 18, segment 17, brush C and conductor E, and thence through the conductor D, segment 16, ring 19, brush 19$^a$ and conductor F. During the next interval of time a segment 16 will again be beneath the brush C and a segment 17 beneath the brush B, but during this interval of time the current will again have changed so that the current will be entering the machine by the conductor F, and passing out of the machine by the conductor G. From the above, it will be clear that a positive current will be continually delivered to the conductor E and return through the conductor D, and in this manner the alternating currents supplied to the machine will be rectified. The same phenomena of sparking as the brushes B and C break contact with the segments will be present when the machine is used to rectify an alternating current, and consequently the auxiliary brushes B' and C' with the interposed condensers will act in the same manner to absorb the current which makes the spark, as has been previously explained. The number of segments employed is quite immaterial so long as there is an even number, and, of course, the greater the number of segments the slower the rotor may be rotated.

It makes no difference what may be the frequency of the alternating current, because this factor may be taken care of by the speed at which the member 7 is rotated, being rotated faster for higher frequencies and slower for the lower frequencies. The problem of synchronizing the rotation of the rotating member to bear a fixed relation to the speed of the generator is one which may be easily solved, and will be clear to those who are skilled in the art.

If desired, more than one set of brushes may be employed in connection with the same rotating member for the purpose of taking off current in addition to the current which is taken off by the brushes previously described, and the number of sets of brushes which may then be employed is limited only by the size of the rotating member.

In Fig. 3 a second set of brushes is shown in connection with the rotating member, which brushes supply a current to the conductors H and I. As shown, these brushes are so placed upon the rotating member as to take off a current which is a half wave length behind the current taken by the first set of brushes. Therefore, the conductors H and I may be used in conjunction with the conductors D and E, and thus form a two-phase alternating circuit. Or, if desired, the current taken over the conductors H and I may be used entirely separate from the current flowing on the conductors D and E. Again, the second set of brushes may be so positioned upon the rotating member as to take off a current which is in phase with the current taken off by the first set of brushes, and in this event, the current thus collected will be entirely distinct from the current taken off by the first set of brushes.

In the construction heretofore described, I have explained the use of an auxiliary brush and condenser in connection with each of the principal brushes, but in the apparatus herein shown and described, the principal brushes B and C may be so positioned with respect to each other that one of them completely breaks contact with its adjacent segment before the other brush has broken engagement with its adjacent segment. That is to say, the break in the circuit may be made to take place at one of the brushes, and when this is done, whatever sparking there may be will take place between the brush thus selected and its segment. Therefore under such an arrangement it would only be necessary to use a condenser between the particular brush which is breaking the circuit and its auxiliary brush, and such an arrangement is entirely within the scope of this invention.

Various modifications may be made in the structure of the machine, which is here described, and I do not limit myself to the precise construction except where this is specifically mentioned.

Having thus described my invention, what I claim is:

1. The combination with an alternating current circuit and a direct current circuit of means for electrically connecting and disconnecting each side of one of said circuits alternately with the opposite sides of the other of said circuits in combination with a circuit containing capacity adapted to be introduced between coöperating sides of said alternating and direct current circuits when the electrical connection between such sides is broken by the aforesaid means.

2. In a current converting device, the combination with a set of insulated segments, means for electrically connecting an alternating current circuit and a direct current circuit with said segments, and a circuit containing capacity connected between coöperating sides of said alternating and direct current circuits, at the time electrical connection between the circuits is broken.

3. In a current converting device, the combination with a set of insulated segments, means for electrically connecting an alternating current circuit and a direct current circuit with said segments, and a circuit containing a condenser introduced between coöperating parts of said alternating and direct current circuits, at the time electrical connection between the circuits is broken.

4. In a current converting device, the combination with a set of insulated segments, direct and alternating current brushes electrically connected with the segments and a circuit containing capacity connected between coöperating pairs of said brushes, at the time the electrical connection between the circuits is broken.

5. In a current converting device, the combination with a set of insulated segments, direct and alternating current brushes electrically connected with the segments, and a circuit containing a condenser connected between coöperating pairs of said brushes, at the time electrical connection between the circuits is broken.

6. In a current converting device, the combination of a rotatable body of conducting segments insulated from each other, a plurality of segments always forming the terminals of an electric circuit, a plurality of brushes, one brush for each of the said segments, which contact with the said segments, the said brushes being terminals for another circuit, and a condenser which remains in the circuit between a given segment and the brush bearing thereon for a short time after the brush has broken contact with said segment.

7. In a current converting device, the combination with a rotatable body of conducting segments thereon insulated from each other and arranged in groups, each of said groups being electrically connected with a separate conductor, a plurality of principal brushes bearing upon the rotating member, there being the same number of principal brushes as there are groups of segments, an auxiliary brush for each principal brush bearing upon a segment of the rotating body which is of the same group as that with which its principal brush is contacting, means electrically connected with each principal brush and its auxiliary brush for absorbing the current when the principal brush breaks contact with a segment, said means being adapted to return the current thus absorbed onto the line when the load brush makes contact with the following segment of the opposite group of segments, and conductors with which the load brushes are connected.

8. In a current converting device, the combination with a rotatable body of conducting segments insulated from each other and arranged in groups, each of the said groups being electrically connected with a separate conductor, a plurality of principal brushes bearing upon the said rotating member, the number of brushes being equal to the number of groups of segments, an auxiliary brush for each principal brush bearing upon the rotating member, each auxiliary brush being spaced from its principal brush so that they will always be in electrical connection with each other through the segments which they engage, a condenser electrically connected with each load brush and its auxiliary brush, and conductors connected with each of the principal brushes.

9. In a current converting device, the combination with a rotatable body of conducting segments which are spaced apart by a distance slightly greater than their width and being insulated from each other, the said segments being divided into two groups, the segments of each group being connected with a conducting ring, a brush bearing upon each ring, conductors connected with the said brushes, a pair of principal brushes bearing upon the said periphery of the rotating member, an auxiliary brush for each principal brush also bearing on the periphery of the rotating member, each auxiliary brush being spaced from the load brush so as to always be in electrical connection therewith through the same group of segments, means electrically connected with each load brush and its adjacent auxiliary brush for absorbing current flowing between the brushes in either direction, and conductors with which the principal brushes are connected.

10. In a current converting device, the combination with a rotatably body of conducting segments which are spaced and insulated from each other, the said segments being divided into two groups, a pair of rings rotating with the said member, each group of segments on the said body being connected with one of the rings, brushes bearing upon said rings, electrical conductors connected with the brushes, two sets of principal brushes bearing upon the said member, the sets being spaced apart and the brushes in each set bearing simultaneously upon the same segment of the said body, one set of brushes being in contact with a segment of one group, while the other set of brushes is in contact with a segment of the other group, a set of auxiliary brushes for each of the principal brushes, each set of brushes being placed upon the rotating member so as to always be in electrical connection with its principal brush by means of the segments, a condenser, in electrical connection with each set of principal brushes and its auxiliary set of brushes, and conductors connected with each set of load brushes.

11. In a current converting device, the combination with a rotatable body of segments spaced and insulated from each other, which segments are arranged in groups each of the said groups being electrically connected with a separate conductor, a plurality of sets of brushes bearing upon the rotating member and spaced from each other so as to be in contact with a segment of a different group of segments, a conductor with which each set of brushes connects, means for equalizing the flow of current between the brushes and the conductor, a plurality of sets of auxiliary brushes bearing on the rotating member, one set for each of the first mentioned brushes, and a condenser connected between each auxiliary set of brushes and each set of the first mentioned brushes.

12. In a current converting device, the combination with a rotatable body of segments which are spaced from each other by a distance substantially twice the width of each segment, said segments being insulated from each other, said segments being arranged in two groups, conductor rings, each of the said groups being electrically connected with a separate conductor ring, brushes bearing upon the said conductor rings, electrical conductors with which the brushes are connected, two sets of brushes bearing upon the rotating member, the brushes in the said sets being spaced from each other, such a distance that the brushes of one set are in contact with the segments in one group, while the brushes of the other set are in contact with the segments in the other group, and conductors connected with said brushes.

In testimony whereof, I hereunto affix my signature in the presence of two witnesses.

ARTHUR R. BULLOCK.

Witnesses:
A. J. HUDSON,
H. R. SULLIVAN.

Copies of this patent may be obtained for five cents each, by addressing the "Commissioner of Patents, Washington, D. C."